US012544616B2

(12) United States Patent
Gillespie

(10) Patent No.: US 12,544,616 B2
(45) Date of Patent: Feb. 10, 2026

(54) LOAD BEARING HINGE JOINT

(71) Applicant: Jeff Gillespie, Naples, FL (US)

(72) Inventor: Jeff Gillespie, Naples, FL (US)

( * ) Notice: Subject to any disclaimer, the term of this patent is extended or adjusted under 35 U.S.C. 154(b) by 128 days.

(21) Appl. No.: 18/375,614

(22) Filed: Oct. 2, 2023

(65) Prior Publication Data

US 2025/0108249 A1 Apr. 3, 2025

(51) Int. Cl.

| | |
|---|---|
| ***A63B 21/16*** | (2006.01) |
| ***A63B 1/00*** | (2006.01) |
| ***A63B 23/12*** | (2006.01) |
| ***F16C 11/04*** | (2006.01) |

(52) U.S. Cl.

CPC ............ *A63B 21/1636* (2013.01); *A63B 1/00* (2013.01); *A63B 23/1218* (2013.01); *F16C 11/04* (2013.01)

(58) Field of Classification Search

CPC ............ A63B 23/1218; A63B 23/1227; A63B 21/1618–1663; A63B 2210/50

See application file for complete search history.

(56) References Cited

U.S. PATENT DOCUMENTS 313,223 A * 3/1885 McMaster ................ A47B 5/04 211/104
2,162,650 A 6/1939 Stephens
2,633,998 A * 4/1953 Derman ................ A47G 25/08 108/29
3,835,847 A * 9/1974 Smith .................. A61H 1/0218 602/32
4,864,691 A 9/1989 Gidseg et al.
5,586,768 A * 12/1996 Pavonetti ............. A63B 63/004 273/400
5,810,702 A * 9/1998 Wilkinson ......... A63B 21/4029 482/130
6,213,924 B1 * 4/2001 Kaiyoorawongs ..... A63B 22/14 482/79
6,290,630 B1 * 9/2001 Boland .............. A63B 21/4035 482/121
6,432,002 B1 * 8/2002 Pavonetti ............. A63B 63/004 273/400
6,508,743 B1 * 1/2003 Fortin ...................... A63B 1/00 482/40

(Continued)

FOREIGN PATENT DOCUMENTS

AU 2015294997 B2 7/2014
CN 115350462 A * 11/2022 ....... A63B 21/00047

*Primary Examiner* — Nyca T Nguyen

(74) *Attorney, Agent, or Firm* — Jacqueline Tadros, Esq.; Jacqueline Tadros, P.A.

(57) ABSTRACT

A load bearing hinge joint, including a first arm member, a second arm member and fastening means for pivotally interconnecting the second arm member to the first. The fastening means are positioned on a first side surface and a second side surface of the first arm member. A support seat is positioned atop a surface of the first arm proximate to a second end of the first arm, wherein the second end is distal and opposite facing a first end of the first arm member and wherein the support seat is configured to receive and support a bottom portion of the second arm member. A shoulder is positioned on a top surface of the first arm member proximate to the support seat, wherein the shoulder acts as a fulcrum to facilitate a pivotal rotation of the second arm member relative to the first arm member at a pivot point.

14 Claims, 11 Drawing Sheets

(56) References Cited

U.S. PATENT DOCUMENTS

| | | | | |
|---|---|---|---|---|
| 7,101,328 | B2 * | 9/2006 | Chiu | A63B 23/0211 D21/687 |
| 7,311,645 | B1 * | 12/2007 | Lynch | A63B 21/0552 482/121 |
| 7,621,861 | B1 * | 11/2009 | Kalember | A63B 22/14 482/79 |
| 7,678,032 | B2 * | 3/2010 | Footnick | A63B 21/0083 482/137 |
| 8,808,147 | B2 | 8/2014 | Gillespie et al. | |
| 9,630,055 | B2 * | 4/2017 | Runyan | A63B 21/00047 |
| 9,675,829 | B1 * | 6/2017 | Katz | A63B 17/02 |
| 10,780,311 | B1 * | 9/2020 | Gadd | A63B 21/00047 |
| 11,701,543 | B1 * | 7/2023 | Smith, Jr. | A63B 21/4033 482/104 |
| 2004/0043877 | A1 * | 3/2004 | Brown | A63B 23/0405 482/130 |
| 2006/0160683 | A1 * | 7/2006 | Schenk | A63B 21/4047 482/142 |
| 2013/0040784 | A1 * | 2/2013 | Gillespie | A63B 23/1218 482/39 |
| 2014/0094350 | A1 * | 4/2014 | Sagall | A63B 69/222 482/89 |
| 2015/0148197 | A1 * | 5/2015 | Lentz | A63B 21/1618 482/40 |
| 2016/0213968 | A1 * | 7/2016 | Boss | A63B 69/0062 |
| 2020/0353611 | A1 * | 11/2020 | Smith | B62H 3/12 |
| 2023/0256284 | A1 * | 8/2023 | Jezwinski | A63B 23/1236 482/121 |

* cited by examiner

LOAD BEARING HINGE JOINT

BACKGROUND OF THE INVENTION

1. Field of the Invention

The present disclosure relates generally to a hinged joint assembly. More particularly, the invention relates to a hinge joint assembly for heavy load bearing applications, including for example, stairs, ladders, chairs, exercise pull-up devices and the like.

2. Description of the Related Art

A hinge is a mechanical bearing that connects two objects for allowing an angle of rotation between the two objects. It is generally known to utilize a hinge to allow for two or more objects to rotate about a fixed axis of rotation.

Hinges known in the art include AU application No. 2015294997 B2 (to Frank) for an improved hinge. The hinge includes a mounting plate, a first arm pivotally coupled to a panel mounting element, a second arm pivotally coupled in a scissoring manner with the first arm by a main pivot, and a third arm pivotally coupled to the second arm at a location between a first end of the second arm and the main point.

The prior art also teaches U.S. Pat. No. 4,864,691 (to Gidseg et al.) for a hinge assembly. The hinge comprises a first hinge assembly which comprises a first hinge bracket attachable to the structural member, a second hinge bracket attachable to the barrier member, a first hinge member mounted for rotation with the second hinge mounting bracket and a second hinge member mounted for rotation with the first hinge member. Both hinge members have correspondingly configured engaging surfaces which permit staged rotation between the hinge members. The first hinge assembly connects to a lower portion of the barrier member to the structural member and is responsible for bearing substantially all of the weight of the barrier member.

U.S. Pat. No. 2,162,650 (to Stephens) discloses a weight bearing hinge. In particular the invention teaches a leaf hinge having a ball and socket joint constructed to allow the weight of the hinged article to be supported upon the ball.

In the context of a hinge joint it is desirable to have a reliable and effective hinge joint assembly that creates an angle of rotation between two objects and may be utilized in a variety of heavy load bearing applications.

SUMMARY OF THE INVENTION

In accordance with the present invention, a load bearing hinge of the invention is disclosed. In one embodiment, the invention teaches two interconnected arm members. In a preferred embodiment, a first arm member includes a shoulder or step, mounted along a length, of a surface of the first arm and at a distance from an end of the first arm. The step or shoulder is preferably permanently affixed to the surface of the first arm. In one embodiment, the step or shoulder is welded to the surface of the first arm. In yet another embodiment, the first arm and step or shoulder are formed from a single injection mold.

In an open or extended configuration, a bottom end, of the second arm of the load bearing hinge, rests on a surface of the first arm, along a length of the surface of the first arm, such that a bottom end of the second arm abuts the shoulder. The shoulder thereby creates a fulcrum or pivot point between the first arm and second arm of the load bearing hinge of the invention.

In a preferred embodiment, a fastener is used to connect the first arm to the second arm and the fastener extends across the step or shoulder.

In a closed or collapsed configuration, the second arm of the load bearing hinge, rests on a top surface of the shoulder or step. The second arm is positioned on the shoulder or step and at a distance from the first arm. In the closed or collapsed configuration, the second arm runs in a longitudinal direction, parallel to the first arm.

In a preferred embodiment, the bottom end of the second arm is flush with an end of the shoulder or step. The step or shoulder thereby creates a fulcrum or pivot point between the first arm and second arm of the load bearing hinge of the invention.

Thus, when the second arm of the load bearing hinge rotates about the step of shoulder to an open or expanded position, the bottom of the second arm locks into position abutting an end of the should or step on the surface of the first arm.

An aspect of the invention is that it easily and readily allows a user to collapse or expand a device using the load bearing hinge joint.

An object of the load bearing hinge joint of the invention is that it is secure and provides a stable and strong attachment for supporting a heavy weight.

An advantage of the load bearing hinge joint of the invention is that it improves hinges known in the art that are prone to slippage and prevents dislodgment.

Another advantage of the load bearing hinge joint of the invention is that it is safe economical and easy to use.

These and other aspects and advantages of the present disclosure will become apparent from the following detailed description of preferred embodiments of the invention considered in conjunction with the accompanying drawings, in which like drawings represent like components. It is to be understood, however, that the drawings are designed solely for purposes of illustration and not as a definition of the limits of the disclosure, for which reference should be made to the appended claims. Moreover, the drawings are not necessarily drawn to scale and that, unless otherwise indicated, they are merely intended to conceptually illustrate the structures and procedures described herein.

BRIEF DESCRIPTION OF THE INVENTION

DETAILED DESCRIPTION OF THE PREFERRED EMBODIMENTS

Figure 1:
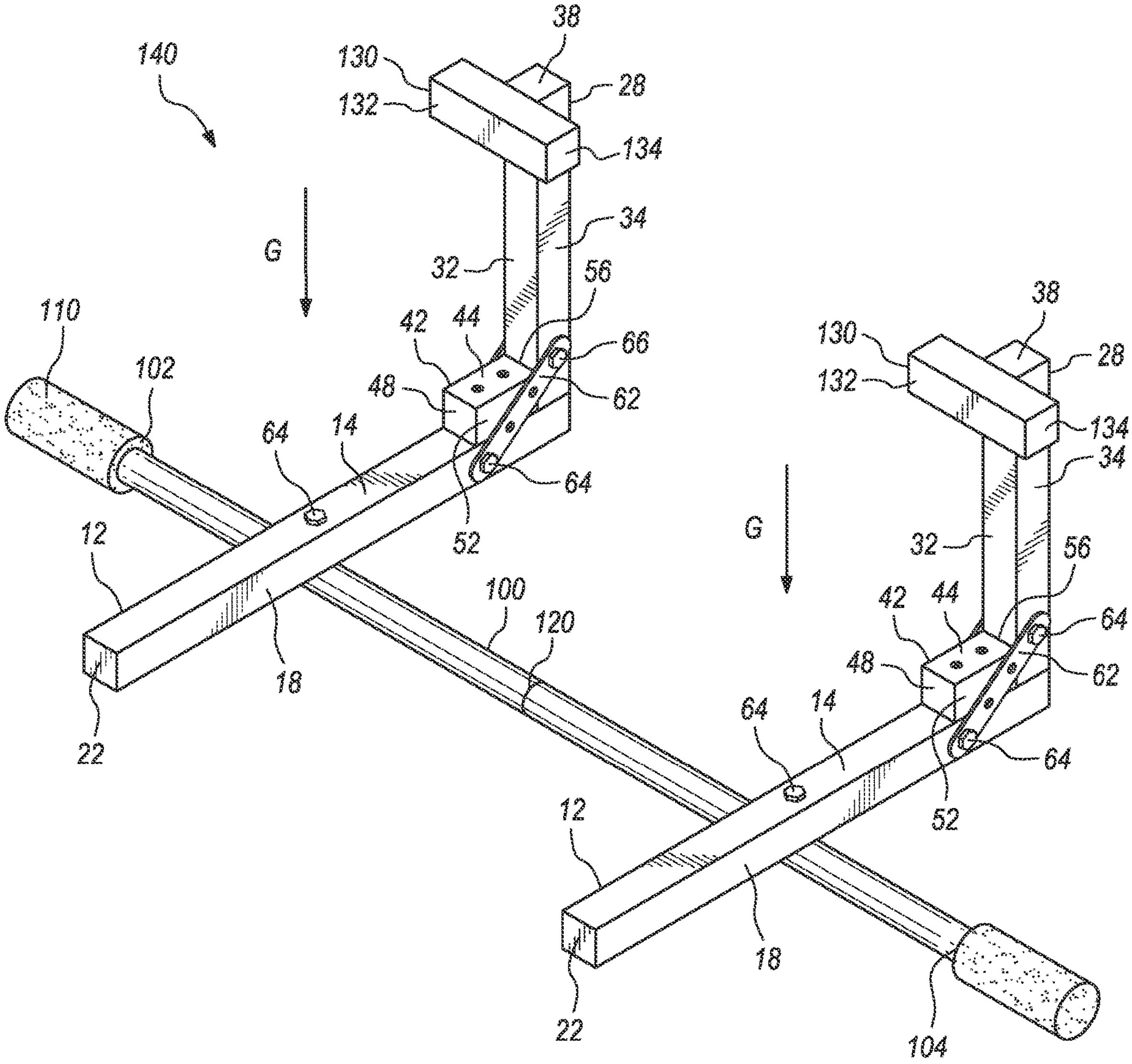
FIG. 1 is a front perspective side view of the load bearing hinge joint of the present invention affixed to a bar forming an exercise pull-up device.

Referring now to FIGS. 1-12, there are shown illustrations of a load bearing hinge joint 10 of the invention. It is appreciated that the load bearing hinge joint 10 of the invention may be used in a variety of structures, wherein the structure may be collapsed or folded for storage purposes and conversely may be manipulated to an expanded configuration when the said structure is in use for bearing a heavy load. Structures using the load bearing hinge may include for example, exercise pull-up devices, stairs, ladders, chairs, shelving units and the like.

The load bearing hinge joint 10 of the invention includes a first arm member 12, a second arm member 28, a shoulder 42 that acts as a fulcrum along a pivot point 56 and one or more fastening means 62. In an expanded configuration of the load bearing hinge 10, the first arm member 12 is at a 90° degree angle to the second arm member 28.

The first arm member 12 includes a top surface 14, a bottom surface 16, a first side surface 18, a second side surface 20, a first end 22 and a second end 24 and a support seat 26 positioned on the top surface 14 of the first arm member 12, whereby the support seat 26 is positioned proximate to the second end 24 and wherein the support seat 26 includes a length that extends a distance D, measured from the second end 24, of the first arm member 12 to a second end 50 of the shoulder 42. The support seat 26 provides a platform to support the second end 24 of the first arm member 12 when a downward force G pushes the first arm member 12 against the support seat 26, such as for example when a downward force G is exerted on the second arm member 28 and/or a bar 100 as shown for example in FIGS. 1, 2 and 12.

The second arm member 28, includes a top surface 30, and a bottom surface 32, a first side surface 34, a second side surface 36, a first end 38 and a second end 40 of the second arm member 28. The first arm member 12 and the second arm member 28 are pivotally connected using one or more fastening means 62. The fastening means 62 include for example a mending brace 62 which connects the first arm member 12 to the second arm member 28 using a bolt 64 and nut attachment.

In a preferred embodiment, one or more apertures 68 are positioned on the first side surface 18 of the first arm member 12 and the first side surface 34 of the second arm member 28. In one embodiment, a plurality of apertures 68 are positioned along the top surface 14, the bottom surface 16, the first side surface 18 and the second side surface 20 of the first arm member 12. In one embodiment, a plurality of apertures 68 are positioned along the top surface 30, the bottom surface 32, the first side surface 34 and the second side surface 36 of the second arm member 28. Preferably, the bolts 64 pass through one or more of the plurality of apertures 68 to affix the mending braces 62 that connect the first arm member 12 to the second arm member 28. In a preferred embodiment, the plurality of apertures 68 of the first side surface 18 of the first arm member 12 and the second side surface 36 of the second arm member 28 are complimentarily aligned. It is appreciated that a plurality of mending braces 62 or other fastening means may be used thereby increasing the weight tolerance of the load bearing hinge joint 10 of the invention.

In a preferred embodiment, the shoulder 42 is positioned on a top surface 14 of the first arm member 12. A second end 50 of the shoulder 42 is positioned at a distance D from the second end 24 of the first arm member 12. In a preferred embodiment, the second end 40 of the second arm member 28, includes a length D1, wherein D1 is equal to D, the length of the support seat, measured from the second end 24 of the first arm member 12 to the second end 50 of the shoulder 42. In another embodiment, D1 is less than D. In one embodiment, the first arm member 12 and the shoulder 42 form a single unitary structure.

In another embodiment, the shoulder 42 may be separately affixed to the first arm member 12. The shoulder 42 includes a first side 52, a second side 54, a first end 48, the second end 50, a top surface 44 and may include a bottom surface 46 when the shoulder 42 is separately affixed to the first arm member 12. In one embodiment, the top surface 44 and the second end 50 of the shoulder 42 form a beveled surface 70.

In an expanded or open configuration, the second end 40 of the second arm member 28 rests on the support seat 26 on the top surface 14 of the first arm member 12. Preferably, the second end 40 of the second arm member 28 has a diameter or a length D1 wherein D1 is the same as the length, D of the support seat 26. In a preferred embodiment D1 is less than or equal to D.

In a collapsed or closed configuration, the bottom surface 32 of the second arm 28 is parallel to the top surface 14 of the first arm 12 and at a distance D2 from the first arm 12. In the collapsed configuration, the bottom surface 32 of the second arm 28 rests on the top surface 44 of the shoulder 42.

It is appreciated that handle 130 may comprise any suitable geometric shape for a particular application without departing from the scope of the invention. For example, and not by way of limitation, the handle 130 is shown as a rectangle in FIGS. 1, 3, 6, 7, 8. A rectangular shape may provide additional surface area for pressure distribution and add stability in certain applications, as shown for example in FIGS. 1, 2, 3, 7 and 8.

The handle 130 is rotatable and may be rotated 360 degrees in any direction relative to the second arm member 28. As shown for example in FIGS. 1, 2, 3, 6, 12 the handle 130 is rotated to a first position when the load bearing hinge joint 10 is in an expanded configuration. Conversely, as shown for example in FIGS. 5, 8, 10, the handle 130 may be rotated to a second position when the load bearing hinge joint 10 is in a collapsed configuration.

In a preferred embodiment, the handle 130 is removably affixed to the second arm member 28 and may be positioned along the bottom surface 32 of the second arm member 28. Preferably the handle 130 is positioned anywhere from a midpoint of the bottom surface 32 to a first end 38 of the second arm member 28. In one embodiment, the bottom surface 32 includes a plurality of holes (not shown) for attaching the handle 130 along various positions on the bottom surface 32. It is appreciated that both the first arm member 12 and second arm member 28 may include a plurality of holes (not shown) for attaching the handle 130, mending brace 62 or bar 100.

Referring now in particular to FIG. 1 there is shown a front perspective side view of the load bearing hinge joint 10 of the present invention affixed to the bar 100 and handle 130 in an exercise pull-up device 140. There is shown the first arm member 12 including the top surface 14 of the first arm member 12, the bottom surface 16 of the first arm member 12, the first side surface 18 of the first arm member 12, the first end 22 and the second end 24 of the first arm member 12.

The second end 40 of the second arm member 28 is positioned at a substantially right angle to the first arm member 12 and proximate to the support seat 26 of the first arm member 12. The second end 24 of the first arm member 12 is positioned distal to the first end 22 of the first arm member 12. As shown, the bar 100 is affixed to the first arm members 12 using a bolt 64 and nut combination. Preferably the bar 100 is foldable at a midpoint 120 and has a length L, wherein L is substantially equal to the width of a typical doorway opening. In a preferred embodiment, the bar 100 includes end covers 110 positioned over a first end 102 of the bar 100 and a second end 104 of the bar 100. Preferably, the end covers 110 are formed of a rubber material for securing the bar 100 within the door frame.

The handle or grip 130 is affixed to a portion of the second arm member 28. In a preferred embodiment, the handle 130 is proximate to the first end 38 of the second arm member 28 for attaching to a support structure. In a preferred embodiment, the support structure is a door frame 200 when the pull-up device 140 is in use. In one embodiment a single handle 130 is affixed to two or more load bearing hinge joints 10. In another embodiment, each hinge joint 10 includes a separate handle 130.

There is shown the second arm member 28, including the top surface 30 of the second arm member 28, the bottom surface 32 of the second arm member 28, the first side surface 34 of the second arm member 28. The second end 40 of the second arm member 28 is positioned atop the support seat 26 of the first arm member 12. The first end 38 of the second arm member 28 is distal to the second end 40 of the second arm member 28. There is shown a plurality of spaced apertures 68 positioned on the first arm member 12 and the second arm member 28 for receiving fastening means, such as the mending brace 62 secured using a nut and bolt 64 attachment and for affixing the bar 100 to the first arm members 12.

The first arm member 12 includes the shoulder 42 which is positioned on the top surface 14 of the first arm member 12 and proximate to the second end 24 of the first arm member 12 and at a distance D from the second end 24 of the first arm member 12, wherein the length of the support seat 26 of the first arm member 12 is shown as D, wherein D is measured from the second end 24 of the first arm member 12 to the second end 50 of the shoulder 42. In a preferred embodiment the first arm member 12 and the shoulder 42, comprise a single unitary member. In another embodiment the shoulder 42 is fixedly secured and affixed to the first arm member 12. There is shown the pivot point 56 of the shoulder 42, the second end 50 of the shoulder 42 aligns with, and abuts to, a lower portion of the bottom surface 32 of the second arm member 28.

One or more mending braces 62 secure the first arm member 12 to the second arm member 28. In a preferred embodiment, the mending braces 62 traverse across the first side 52 of the shoulder 42 and the second side 54 of the shoulder 42 to secure the first arm member 12 to the second arm member 28. The mending braces 62 are secured to the first arm member 12 using a bolt 64 and nut (not shown) combination. The bolt 64 passes through the aperture 68 located on the first side 18 of the first arm member 12 through to the second side 20 of the first arm member 12 and is secured using the bolt 64 and nut (not shown). The mending brace 62 is similarly secured to the second arm member 28 using the bolt 64 and nut (not shown) connection. The bolt 64 passes through the aperture 68 located on the first side 34 of the second arm member 28 to the second side 36 of the second arm member 28 and is secured and the second arm member 12 using the bolt 64 and nut (not shown).

In one embodiment, a plurality of mending braces 62 are used to secure the first arm member 12 to the second arm member 28 to ensure a stronger connection between the first arm member 12 and the second arm member 28. The plurality of mending braces 62 secure the first arm member 12 to the second arm member 28 using for example connection means such as bolts 64 and nuts (not shown), wherein the bolts 64 pass through the apertures 68 and are secured using nuts (not shown).

Figure 2:
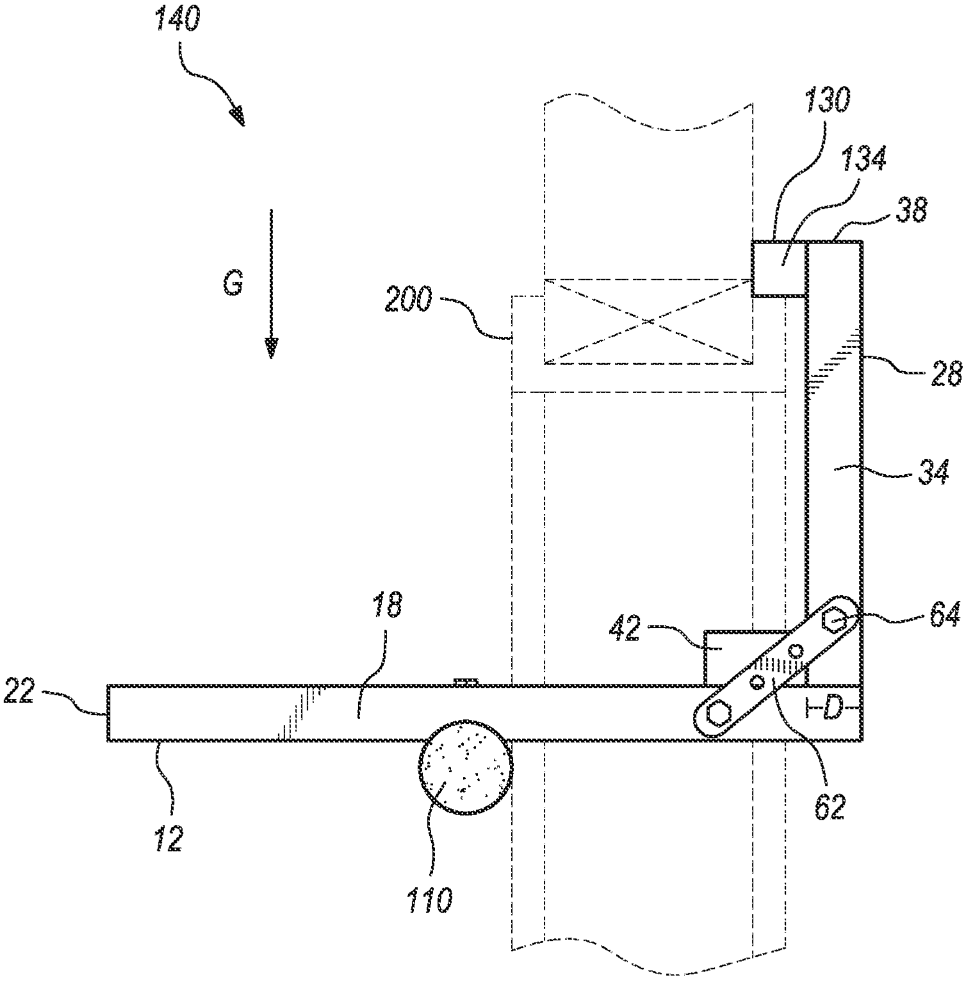
FIG. 2 is a side view of the load bearing hinge joint incorporated in an exercise pull-up device as shown in FIG. 1 for use in conjunction with a door frame.

Referring now in particular to FIG. 2 there is shown a side view of the load bearing hinge joint 10 incorporated in an exercise pull-up device 140 as shown in FIG. 1 for use in conjunction with a door-frame 200. As shown, the handle or grip 130 is configured to sit atop the door frame 200 when the pull-up device 140 is in use.

Figure 3:
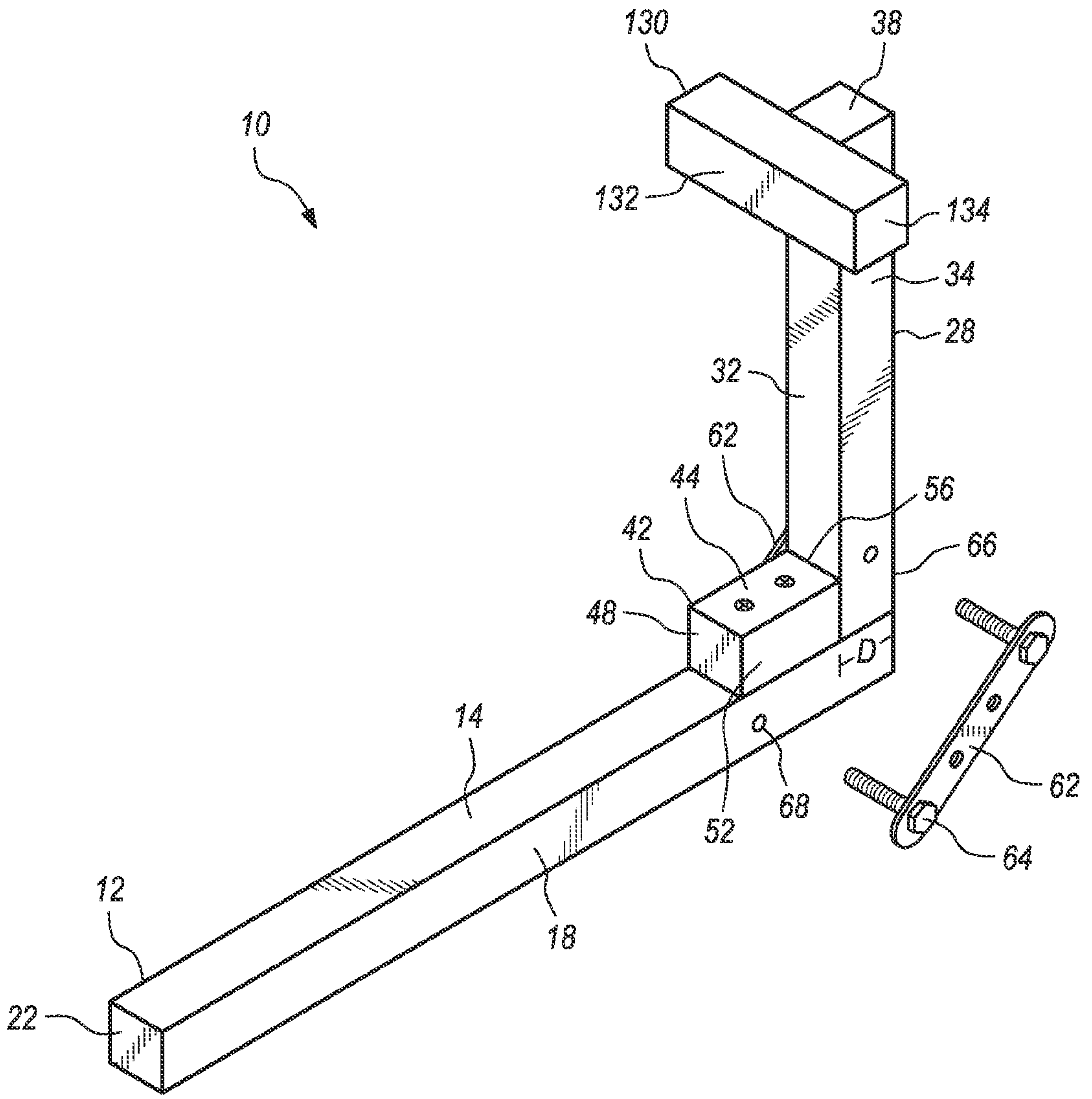
FIG. 3 is a side perspective view of the load bearing hinge joint of the present invention in an open or expanded configuration.

Referring now in particular to FIG. 3 there is shown a side perspective view of the load bearing hinge joint 10 of the present invention in an open configuration. The first arm member 12, includes the first end 22, the second end 24, the top surface 14, the bottom surface 16 (shown in FIGS. 6, 7, 8), the first side surface 18 and the second side surface 20 (shown in FIGS. 6, 7, 8). The support seat 26 (shown in FIGS. 4, 5) of the first arm member 12 includes a length D, wherein D is the distance measured from the second end 24 of the first arm 12 to the second end 50 of the shoulder 42.

Figure 6:
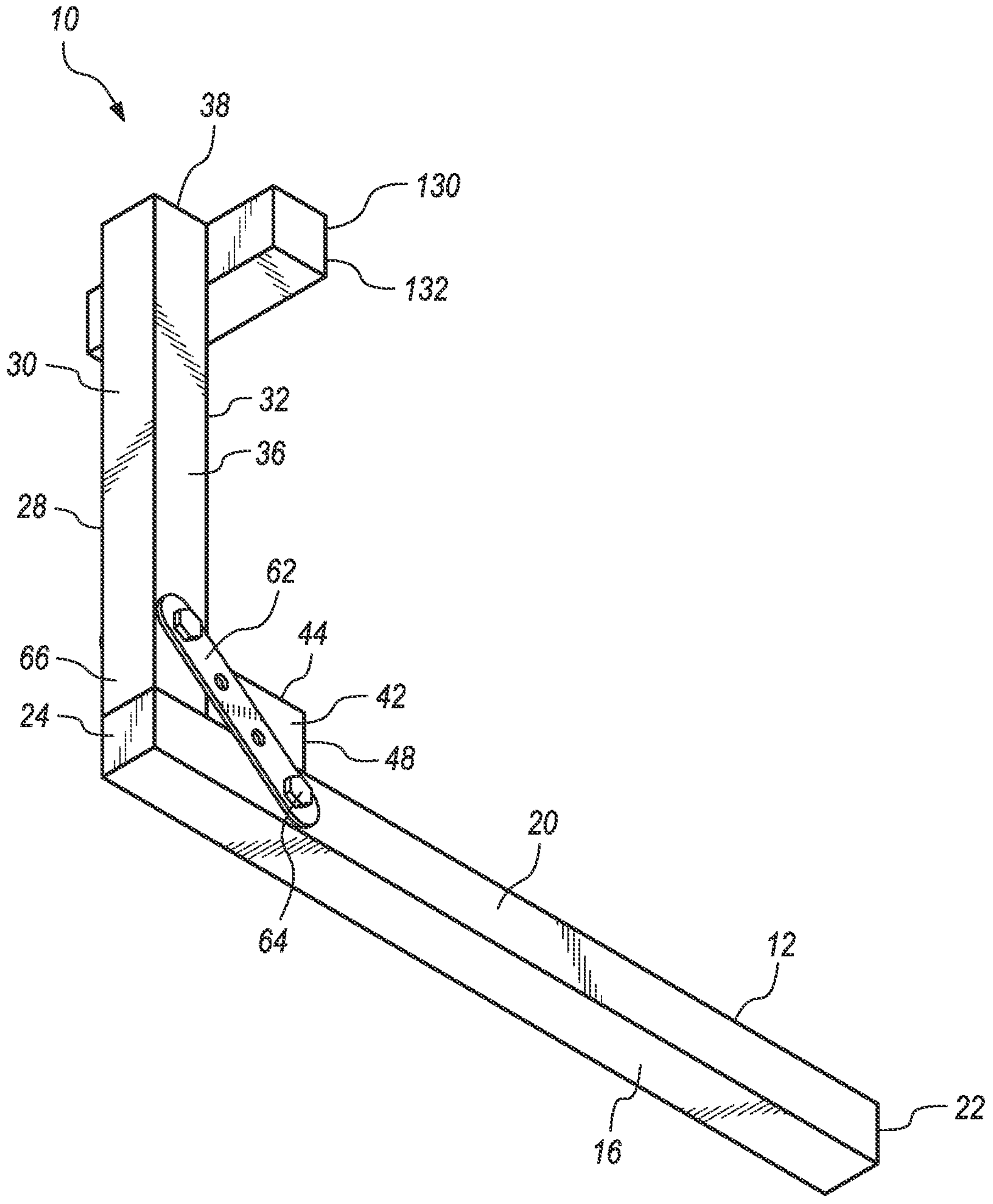
FIG. 6 is a rear side perspective view of the load bearing joint of the present invention in an open or expanded configuration.
Figure 7:
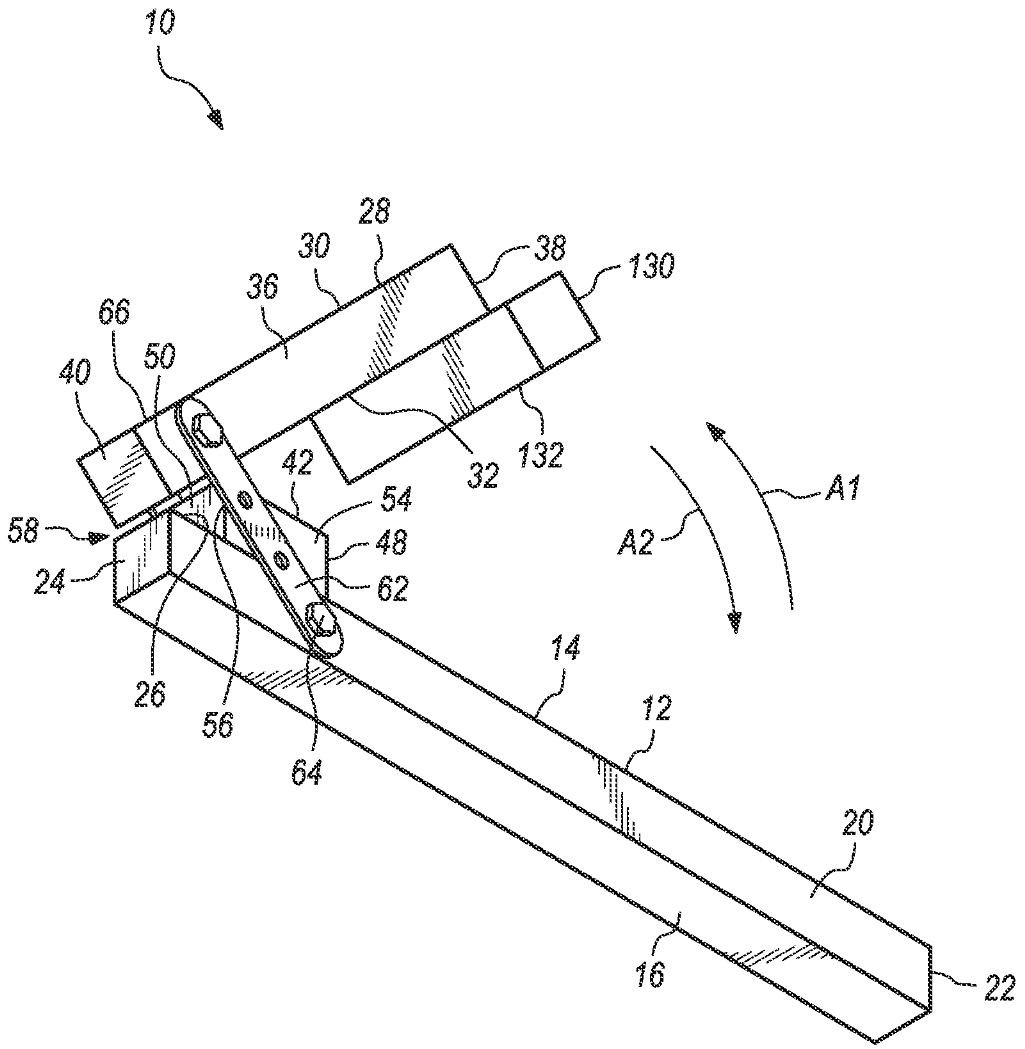
FIG. 7 is a rear side perspective view of the load bearing joint of the present invention as it transitions from a collapsed or folded to an open configuration and/or vice versa.
Figure 8:
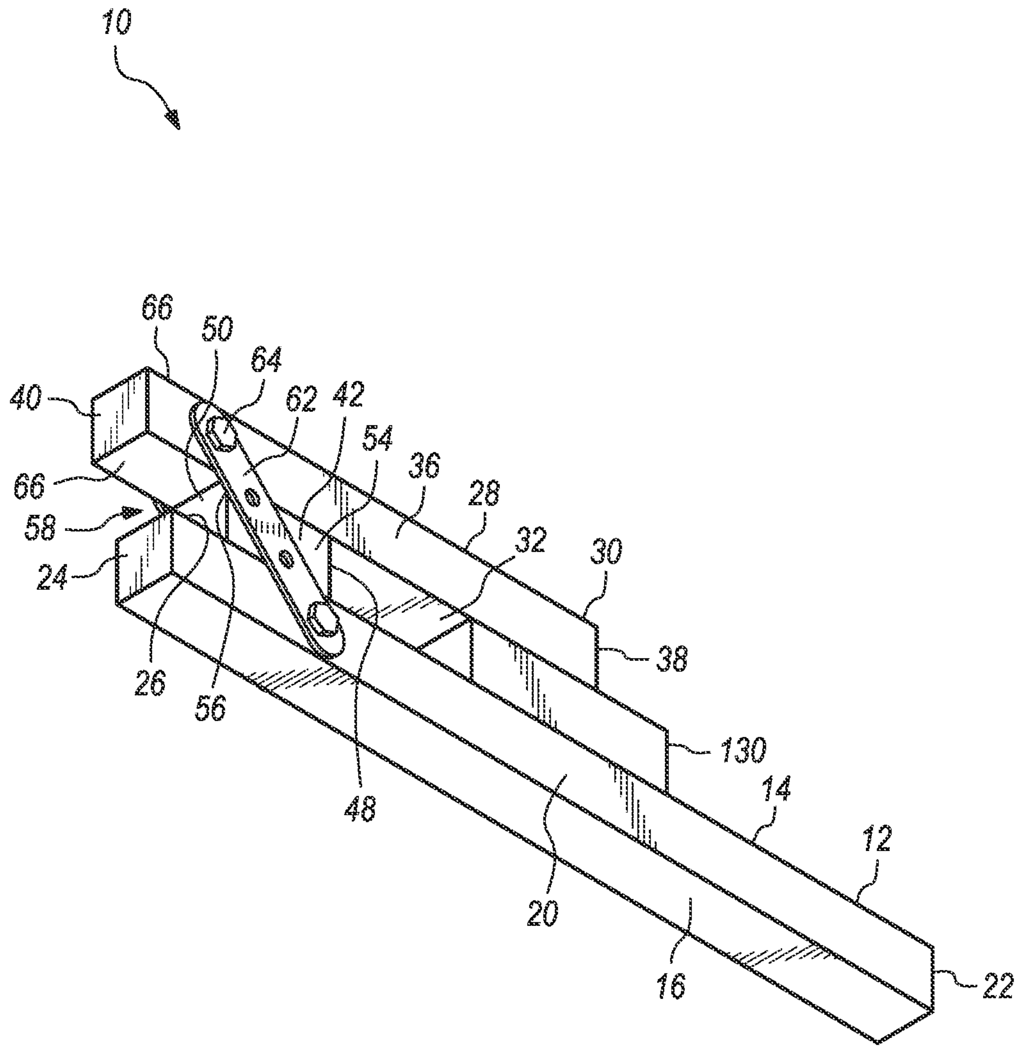
FIG. 8 is a rear side perspective view of the load bearing joint of the present invention in a closed configuration.

The shoulder 42 of the first arm member 12 includes the top surface 44, the bottom surface 46 (shown in FIG. 12), the first end 48, the second end 50, the first side 52 and the second side 54 (shown in FIGS. 6, 7, 8). In this embodiment, the shoulder 42 and the first arm member 12 comprise a single unitary body.

The second arm member 28, includes the top surface 30 (shown in FIGS. 5, 6, 7, 8), the bottom surface 32, the first side 34, the second side 36 (not shown), first end 38, the second end 40 (shown in FIGS. 7, 8, 10) whereby the second end 40 is supported by and sits atop the support seat 26. The second end 40 includes a length D1, wherein D1 is less than or equal to D. In a preferred embodiment, illustrated in FIG. 3, D1 is equal to D. A bottom portion 66 of the second arm member 28 positioned on the bottom surface 32 and proximate to the second end 40 abuts the second 50 of the shoulder 42.

Mending braces 62 connect the first arm member 12 to the second arm member 28. Apertures 68 along the first arm member 12 and second arm member 28 are positioned for receiving bolts 64 to secure the first arm member 12 to the second arm member 28 thereby allowing the second arm member 28 to pivot about the shoulder 42 of the first arm member 12 about pivot point 56. The shoulder 42 acts as a fulcrum to enable engagement between the first arm member 12 and the second arm member 28 to transition from an open or expanded configuration to a closed or expanded configuration. In a preferred embodiment, the mending braces 62 traverse the first side 52 of the shoulder 42 and the second side 54 of the shoulder 42 of the first arm member 12 member 12.

Figure 4:
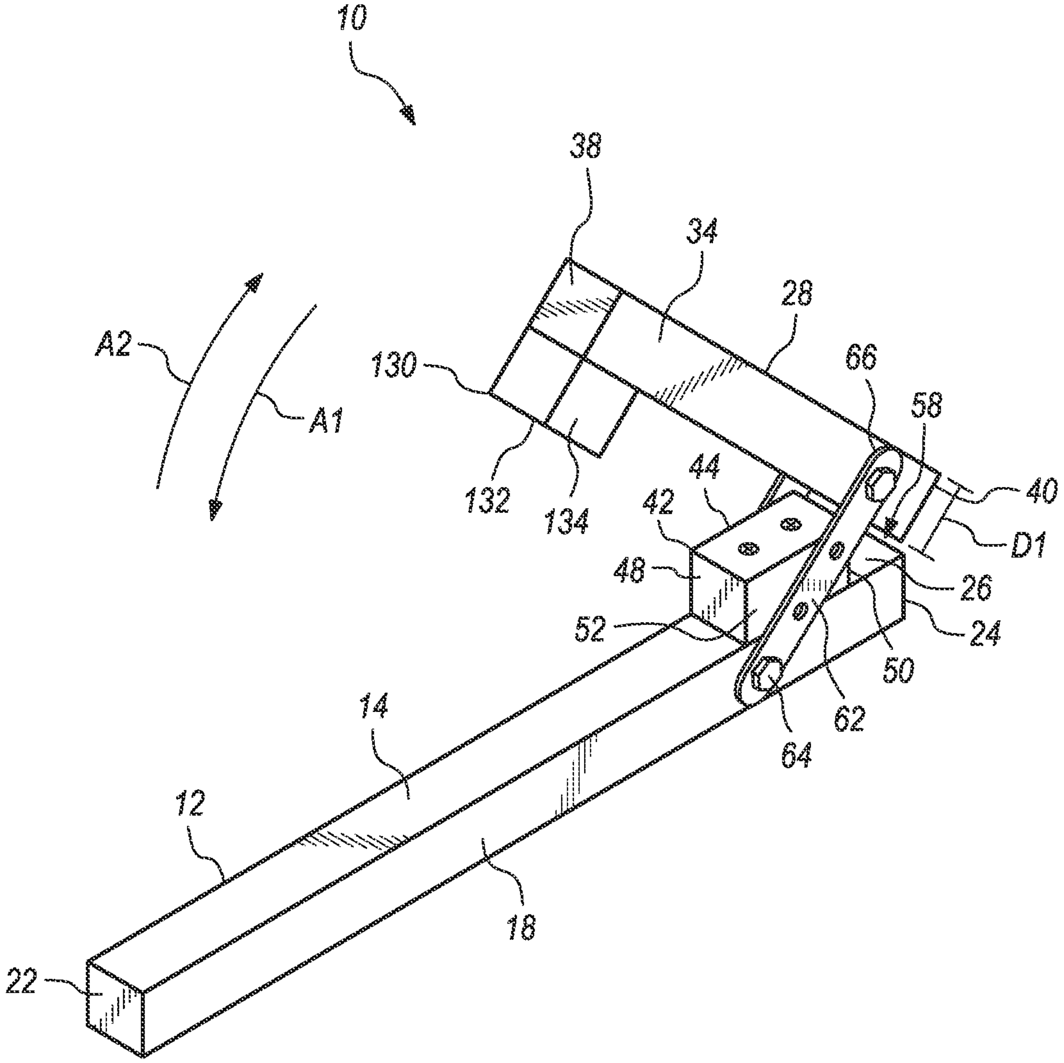
FIG. 4 is a perspective view of the load bearing hinge joint of the present invention as it transitions from a collapsed or folded to an open or expanded configuration and/or vice versa.

Referring now in particular to FIG. 4 is a perspective view of the load bearing hinge joint 10 of the present invention as it transitions from a collapsed or folded configuration as illustrated by arrow A1 to an open or expanded configuration as illustrated by arrow A2. In this embodiment, the shoulder 42 is affixed to the first arm member 12. The fastening means 62 which secure the first arm member 12 to the second arm member 28 allow for a rotation of movement to transition the load bearing hinge joint 10 from a collapsed configuration to an open configuration and vice versa. As shown, the handle or grip 130 is affixed to the second arm member 28. In a preferred embodiment, the handle 130 is positioned on a bottom surface 32 of the second arm member 28 proximate to the first end 38 and distal to the second end 40 of the second arm member 28. In one embodiment, the handle 130 and the second arm member 12 comprise a unitary body. In another embodiment, the handle 130 is affixed to the second arm member 12.

Referring to arrow A2, there is shown the second arm member 28 as it transitions from a position of rest on the shoulder 42 and pivots about the pivot point 56 which acts as a fulcrum. A clearance area 58 formed between the support seat 26 and second end 50 of the shoulder 42 is dimensioned to receive the bottom portion 66 of the second arm member 28 and to allow the bottom portion 66 of the second arm member 28 to swivel about the pivot point 56 and slide into the clearance area 58 as the second end 40 of the second arm member 28 comes to rests on the support seat 26 of the first arm member 12 when the load bearing joint 10 is in an open configuration and the second arm member 28 is at a right angle to the first arm member 12.

In one embodiment, the clearance area 58 is greater than or equal to the area of the bottom portion 66 of the second arm member 12. In a preferred embodiment, the clearance area is equal to the area of the bottom portion 66 of the second arm member, thereby allowing the bottom portion 66 of the second arm member 28 to occupy the clearance area 58. In another embodiment, the bottom portion 66 of the second arm member 28 occupies an area smaller in size than the clearance area 58.

Referring to arrow A1, there is shown the second arm member 28 as it transitions from an open configuration to a collapsed or folded configuration. In this scenario, as the bottom portion 66 of the second arm member 28 rotates about the pivot point 56, the second end 40 of the second arm member 28 lifts from its position on the support seat 26. In a collapsed configuration, the bottom surface of 32 of the second arm member 28 is parallel to the top surface 14 of the first arm member 12 and at a distance D2 from the first arm member 12. In this collapsed configuration, a portion of the bottom surface 32 of the second arm member 28 rests on a portion of the top surface 44 of the shoulder 42.

Figure 5:
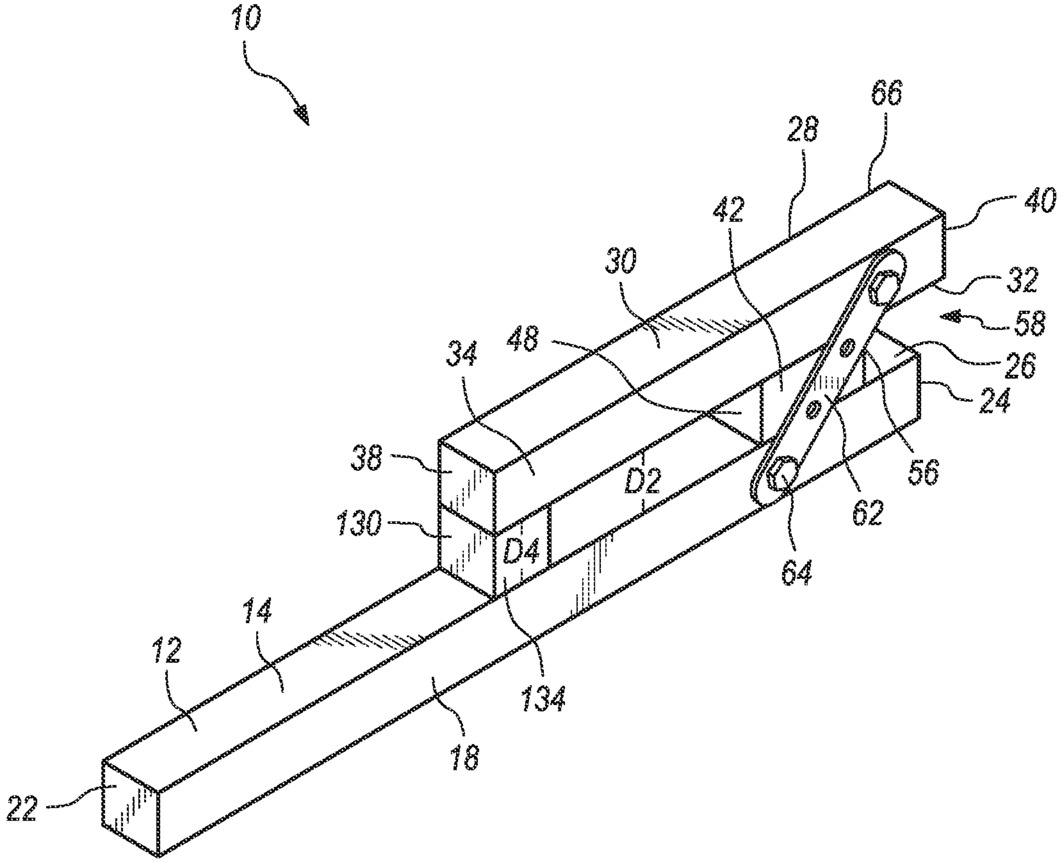
FIG. 5 is a front perspective side view of the load bearing hinge joint of the present invention in a fully collapsed configuration.

Referring now in particular to FIG. 5 is a front perspective side view of the load bearing hinge joint 10 of the present invention in a fully collapsed configuration. In this configuration, the second arm member 28 is parallel to the first arm member 12 and at a distance D2 from the first arm member 12. In this collapsed configuration, at least a portion of the bottom surface 32 of the second arm member 28 rests on the top surface 44 of the shoulder 42. At least one of the mending braces 62 traverse across the first side 52 and second side 54 (shown in FIG. 8) of the shoulder 42 and connects the first arm member 12 to the second arm member 28. The first side 52 of shoulder 42 is opposite facing to, and at a distance D3, from the second side 54 of the shoulder 42. In a preferred embodiment, D3 is also the distance from the first side surface 18 of the first arm 12 to the second side surface 20 of the first arm 12.

In this configuration, the bottom portion 66 of the second arm member 28, including the second end 40 of the second arm 28 extend beyond the second end 24 of the first arm 12 and outside clearance area 58.

A front surface 132 of the handle 130 contacts and sits on the top surface 14 of the first arm member 12, when the load bearing hinge joint 10 is in a collapsed or closed configuration. In a preferred embodiment, a first side surface 134 of the handle 130 has a width D4, whereby D4 is the same as D2, the distance between the bottom surface 32 of the second arm member 28 and the top surface 14 of the first arm member 12 when the load bearing hinge joint 10 is in a closed or collapsed configuration.

Referring now in particular to FIG. 6 there is shown a rear side perspective view of the load bearing joint 10 of the present invention in an open or expanded configuration. The first arm member 12, includes the first end 22, the second end 24, the top surface 14 (shown in FIGS. 3, 4, 5), the bottom surface 16, the first side surface 18 (shown in FIGS. 3, 4, 5) and the second side surface 20. The support seat 26 (shown in FIGS. 4, 5) of the first arm member 12 includes a length D, wherein D is the distance measured from the second end 24 of the first arm 12 to the second end 50 of the shoulder 42 (shown in FIGS. 4,5).

The shoulder 42 of the first arm member 12 includes the top surface 44 (shown in FIGS. 3, 4), the bottom surface 46 (shown in FIG. 12), the first end 48, the second end 50 (shown in FIGS. 4, 5), the first side 52 (shown in FIGS. 3, 4, 5) and the second side 54.

The second arm member 28, includes the top surface 30, the bottom surface 32, (shown in FIGS. 3, 4) the first side 34 (shown in FIGS. 3, 4, 5), the second side 36, first end 38, the second end 40 (shown in FIGS. 7, 8, 10) whereby the second end 40 is supported by and sits atop the support seat 26. The second end 40 includes a length D1, wherein D1 is less than or equal to D. A bottom portion 66 of the second arm member 28 positioned on the bottom surface 32 and proximate to the second end 40 abuts the second 50 of the shoulder 42.

Mending braces 62 connect the first arm member 12 to the second arm member 28. Apertures 68 along the first arm member 12 and second arm member 28 are positioned for receiving bolts 64 to secure the first arm member 12 to the second arm member 28 thereby allowing the second arm member 28 to pivot about the shoulder 42 of the first arm member 12 about pivot point 56. In a preferred embodiment, the mending braces 62 traverse the first side 52 of the shoulder 42 and the second side 54 of the shoulder 42 of the first arm member 12 member 12.

Referring now in particular to FIG. 7 there is shown a rear side perspective view of the load bearing joint of the present invention as it transitions from a collapsed or folded configuration as illustrated by arrow A1 to an open or expanded configuration as illustrated by arrow A2. The fastening means 62 which secure the first arm member 12 to the second arm member 28 allow for a rotation of movement to transition the load bearing hinge joint 10 from a collapsed configuration to an open configuration and vice versa. As shown, the handle 130 is affixed to the second arm member 28. In a preferred embodiment, the handle 130 is positioned on a bottom surface 32 of the second arm member 28 proximate to the first end 38 and distal to the second end 40 of the second arm member 28. In one embodiment, the handle 130 and the second arm member 12 comprise a unitary body. In another embodiment, the handle 130 is affixed to the second arm member 12.

Referring to arrow A2, there is shown the second arm member 28 as it transitions from a position of rest on the shoulder 42 and pivots about the pivot point 56 of the shoulder 42 which acts as a fulcrum. A clearance area 58 formed between the support seat 26 and second end 50 of the shoulder 42 is dimensioned to receive the bottom portion 66 of the second arm member 28 and to allow the bottom portion 66 of the second arm member 28 to swivel about the pivot point 56 and slide into the clearance area 58 as the second end 40 of the second arm member 28 comes to rests on the support seat 26 of the first arm member 12 when the load bearing joint 10 is in an open configuration and the second arm member 28 is at a right angle to the first arm member 12.

In one embodiment, the clearance area 58 is greater than or equal to the area of the bottom portion 66 of the second arm member 12. In a preferred embodiment, the clearance area is equal to the area of the bottom portion 66 of the second arm member, thereby allowing the bottom portion 66 of the second arm member 28 to occupy the clearance area 58. In another embodiment, the bottom portion 66 of the second arm member 28 occupies an area smaller in size than the clearance area 58.

Referring to arrow A1, there is shown the second arm member 28 as it transitions from an open configuration to a collapsed or folded configuration. In this scenario, as the bottom portion 66 of the second arm member 28 rotates about the pivot point 56, the second end 40 of the second arm member 28 lifts from its position on the support seat 26. In a collapsed configuration, the bottom surface of 32 of the second arm member 28 is parallel to the top surface 14 of the first arm member 12 and at a distance D2 from the first arm member 12. In this collapsed configuration, a portion of the bottom surface 32 of the second arm member 28 rests on a portion of the top surface 44 of the shoulder 42.

Referring now in particular to FIG. 8 there is shown a rear side perspective view of the load bearing joint 10 of the present invention in a closed configuration. The second arm member 28 is parallel to the first arm member 12 and a distance D2 from the first arm member 12. In this collapsed configuration, at least a portion of the bottom surface 32 of the second arm member 28 rests on the top surface 44 (shown in FIGS. 2, 3) of the shoulder 42. At least one of the mending braces 62 traverse across each of the first side 52 (shown in FIG. 5) and second side 54 of the shoulder 42 and connect the first arm member 12 to the second arm member 28. The first side 52 (shown in FIG. 5) of shoulder 42 is opposite facing to, and at a distance D3, from the second side 54 of the shoulder 42.

In this configuration, the bottom portion 66 of the second arm member 28, including the second end 40 of the second arm 28 extend beyond the second end 24 of the first arm 12 and beyond clearance area 58.

A front surface 132 (shown in FIG. 3) of the handle 130 contacts and sits on the top surface 14 (shown in FIGS. 3, 4, 5) of the first arm member 12, when the load bearing hinge joint 10 is in a collapsed or closed configuration. In one embodiment, a first side surface 134 (shown in FIGS. 3, 4) of the handle 130 has a width D4, whereby D4 is the same as D2, the distance between the bottom surface 32 of the second arm member 28 and the top surface 14 (shown in FIGS. 3, 4) of the first arm member 12 when the load bearing hinge joint 10 is in a closed or collapsed configuration.

Figure 9A:
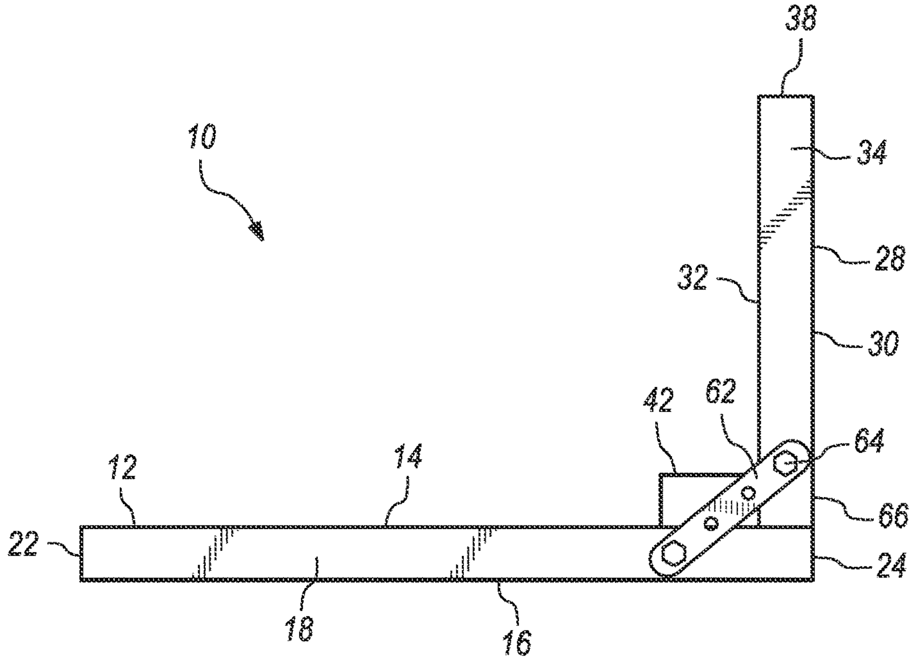
FIG. 9A is a side view of the load bearing hinge joint of the present invention in an open or expanded configuration.
Figure 9B:
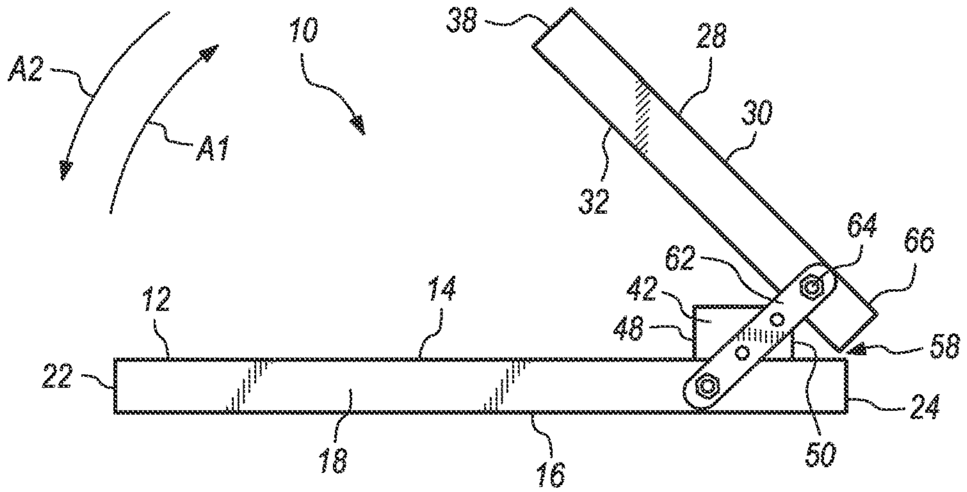
FIG. 9B is another side view of the load bearing hinge joint of the present invention as it transitions from a collapsed or folded to an open or expanded configuration and/or vice versa.

Referring now in particular to FIG. 9 there is shown a side view of another embodiment of the load bearing hinge joint 10 of the present invention in an open or expanded configuration.

Referring now in particular to FIG. 9A this is shown another side view of the load bearing hinge joint 10 of the present invention as it transitions from a collapsed or folded configuration as illustrated by arrow A1 to an open or expanded configuration as illustrated by arrow A2.

Figure 10:
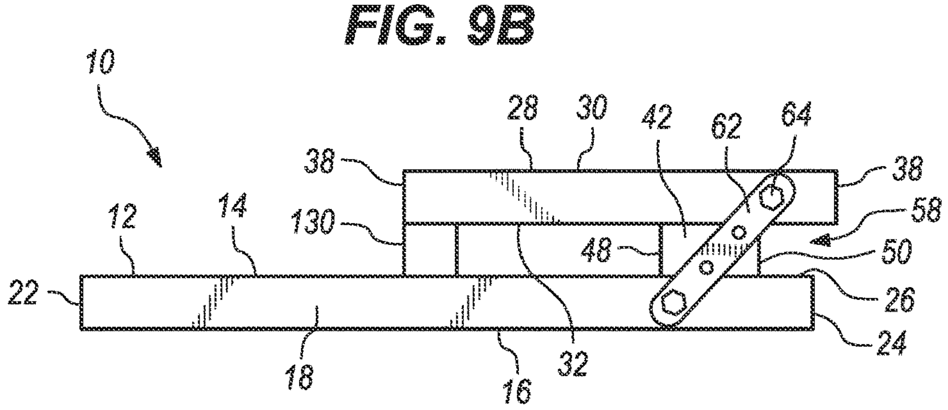
FIG. 10 is a side view of the load bearing hinge joint of the present invention in a collapsed configuration.

Referring now in particular to FIG. 10 there is shown a side view of the load bearing hinge joint 10 of the present invention in a collapsed configuration. In this configuration, the second arm member 28 is parallel to the first arm member 12 and at a distance D2 from the first arm member 12. In this collapsed configuration, at least a portion of the bottom surface 32 of the second arm member 28 rests on the top surface 44 of the shoulder 42. At least one of the mending braces 62 traverse across the first side 52 and second side 54 (shown in FIG. 8) of the shoulder 42 and connects the first arm member 12 to the second arm member 28. The first side 52 of shoulder 42 is opposite facing to, and at a distance D3, from the second side 54 of the shoulder 42.

In this configuration, the bottom portion 66 of the second arm member 28, including the second end 40 of the second arm 28 extend beyond the second end 24 of the first arm 12 and outside clearance area 58.

A front surface 132 (shown in FIG. 3) of the handle 130 contacts and sits on the top surface 14 of the first arm member 12, when the load bearing hinge joint 10 is in a collapsed or closed configuration. In a preferred embodiment, a first side surface 134 of the handle 130 has a width D4, whereby D4 is the same as D2, the distance between the bottom surface 32 of the second arm member 28 and the top surface 14 of the first arm member 12 when the load bearing hinge joint 10 is in a closed or collapsed configuration.

Figure 11:
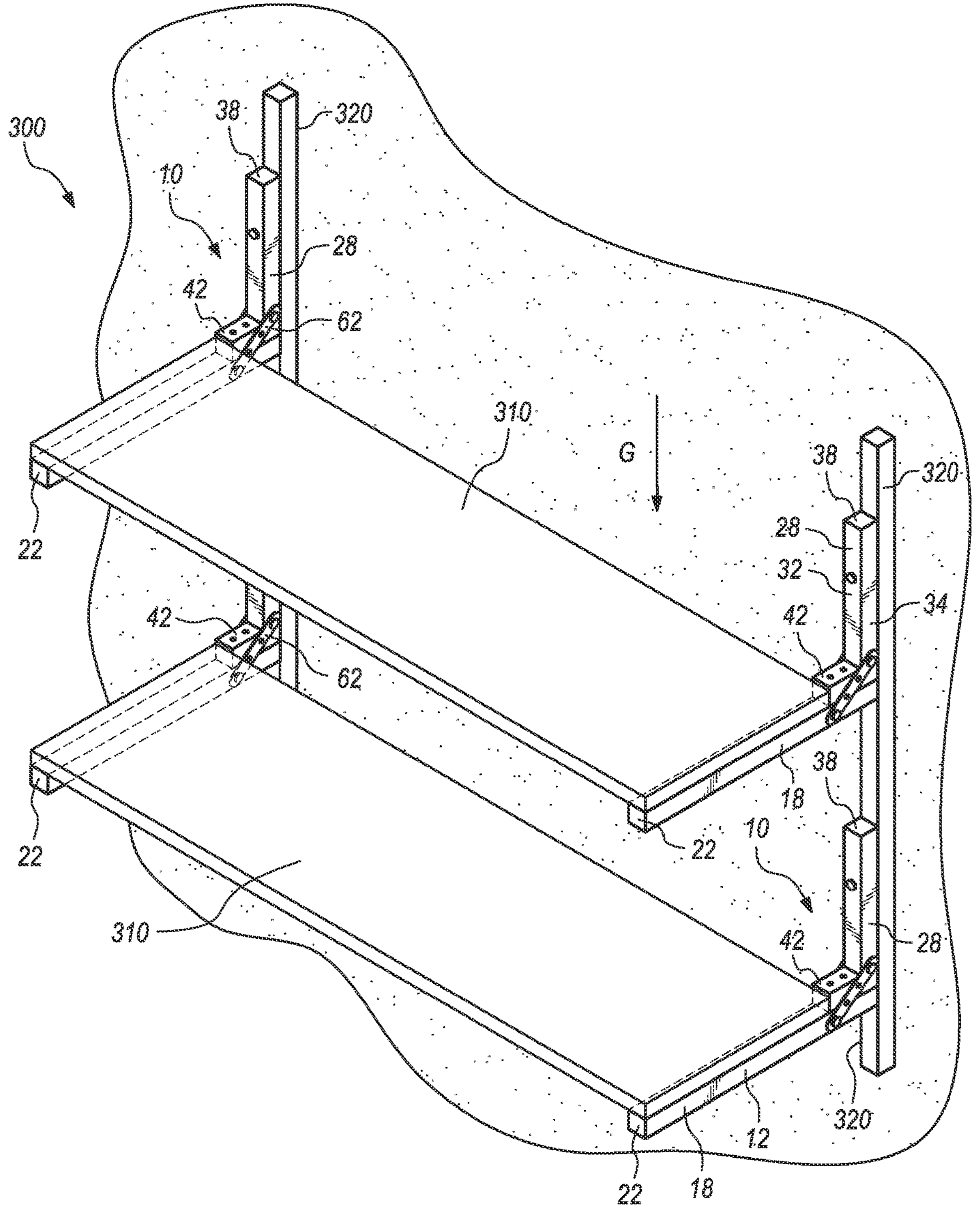
FIG. 11 is a side view of the load bearing hinge joint of the present invention in an open or expanded configuration incorporated in a shelving unit assembly.

Referring now in particular to FIG. 11 there is shown a perspective side view of the load bearing hinge joint 10 of the present invention in an open or expanded configuration incorporated in a shelving unit assembly 300. The load bearing hinge joint 10 is affixed to a support frame 320, a shelf 310 is affixed to the top surface 14 of the first arm member 12. In one embodiment, a plurality of load bearing hinge joints 10 may be used to support each shelf.

Figure 12:
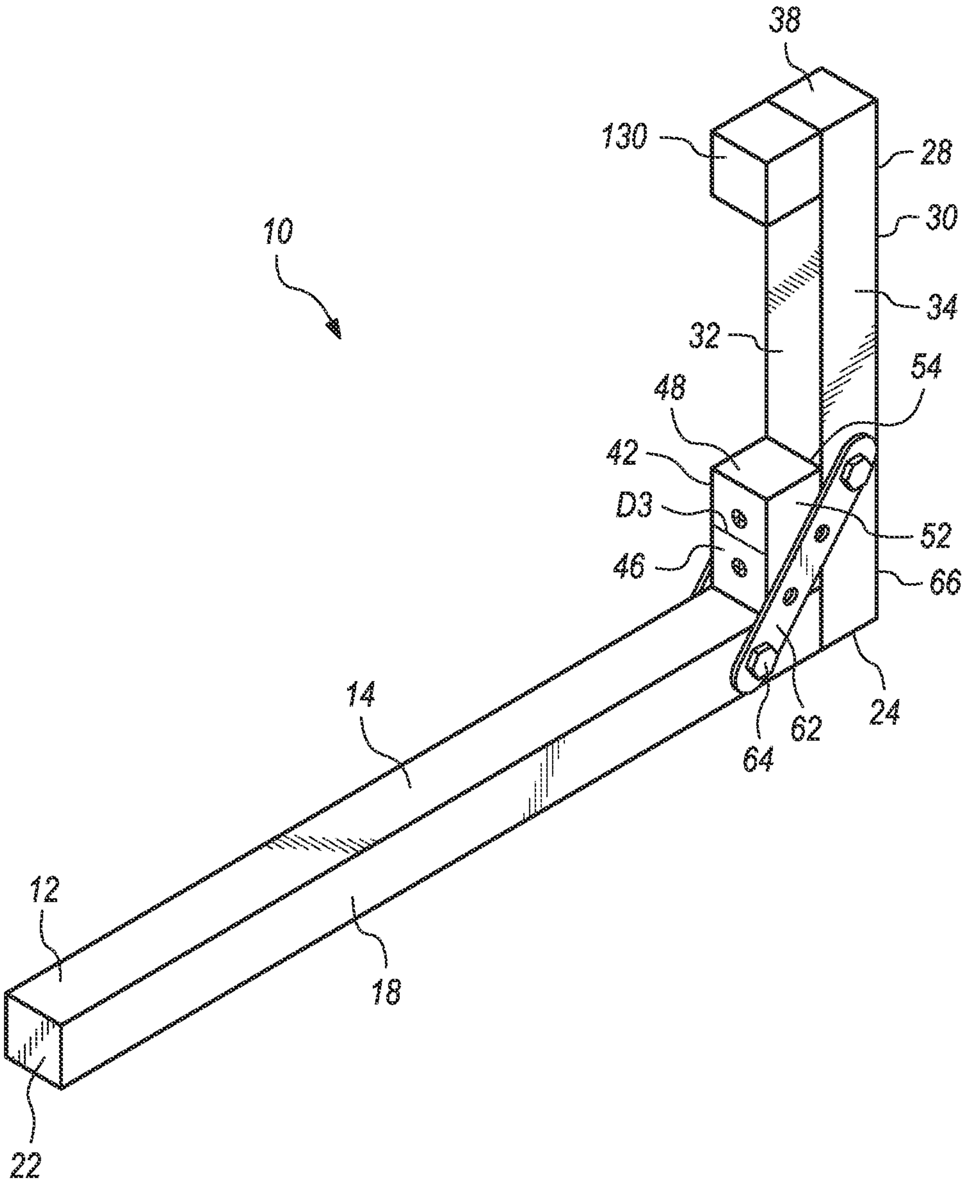
FIG. 12 is another front perspective side view of the load bearing hinge joint of the present invention in an open or expanded configuration.

Referring now in particular to FIG. 12 there is shown another front perspective side view of the load bearing hinge joint 10 the present invention in an open or expanded configuration.

Thus, while there has been shown and described, fundamental novel features of the disclosure as applied to various specific embodiments thereof, it will be understood that various omissions and substitutions and changes in the form and details of the apparatus illustrated, and in their operation, may be made by those skilled in the art without departing from the spirit of the disclosure. For example, it is expressly intended that all combinations of those elements which perform substantially the same function, in substantially the same way, to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore to be limited only as indicated by the scope of the claims appended hereto.

What is claimed is:

1. A load bearing hinge joint comprising:

a first arm member, wherein the first arm member includes a top surface, a bottom surface, a first side surface, a second side surface, a first end and a second end; wherein the first side surface of the first arm member is opposite to, and at a first distance from, the second side surface of the first arm member;

a second arm member; wherein the second arm member includes a top surface, a bottom surface, a first side surface, a second side surface, a first end and a second end; wherein the first side surface of the second arm member is opposite to, and at a second distance from, the second side surface of the second arm member;

fastening means for pivotally interconnecting the second arm member to the first arm member, wherein a first fastening means positioned on the first side surface of the first arm member connects the first arm member to the second arm member at the first side surface of the second arm member; and wherein a second fastening means positioned on the second side surface of the first arm member connects the first arm member to the second arm member at the second side surface of the second arm member;

a support seat, wherein the support seat is positioned on the top surface of the first arm member proximate to the second end of the first arm member, wherein the second end is distal to and opposite facing the first end of the first arm member and wherein the support seat is configured to receive and support a bottom portion of the second arm member; and a shoulder, wherein the shoulder is positioned on the top surface of the first arm member, proximate to the support seat and wherein a second end of the shoulder most proximate to the second end of the first arm member is configured to act as a fulcrum to facilitate a pivotal rotation of the second arm member relative to the first arm member at a pivot point.

2. The load bearing hinge joint of claim 1, wherein the first arm member and the shoulder comprise a single unitary body.

3. The load bearing hinge joint of claim 1, wherein the shoulder includes a top surface, a bottom surface, a first side, a second side, a first end and the second end.

4. The load bearing hinge joint of claim 1, wherein at least one of the fastening means for pivotally connecting the first arm member to the second arm member traverses across the first side of the shoulder.

5. The load bearing hinge joint of claim 3, wherein the second end of the shoulder is positioned at a third distance from the second end of the first arm member.

6. The load bearing hinge joint of claim 5, wherein a segment of the bottom portion of the second arm member is configured to abut the second end of the shoulder when the second arm member is at a substantially right angle to the first arm member.

7. The load bearing hinge joint of claim 1, wherein a handle is affixed to the second arm member, proximate to the first end of the second arm member.

8. The load bearing hinge joint of claim 7, further including a bar affixed to the first arm member of the load bearing hinge joint, and wherein the bar is configured to fit within a frame of a doorway.

9. The load bearing hinge joint of claim 8, wherein the bar is affixed to a second load bearing hinge joint.

10. The load bearing hinge joint of claim 1, wherein the support seat includes a first area, and wherein the second end of the second arm member includes a second area, and wherein the first area of the support seat is equal to or greater than the second area.

11. The load bearing hinge joint of claim 1, wherein the bottom surface of the second arm member rests on the shoulder, such that the bottom surface of the second arm member is at a fourth distance from the top surface of the first arm member when the load bearing hinge is in a closed configuration.

12. The load bearing hinge joint of claim 11, wherein a clearance area between the support seat and the shoulder is configured and dimensioned to receive the bottom portion of the second arm member to allow the bottom portion of the second arm member to swivel about the shoulder and slide into the clearance area when the second end of the second arm member sits on the support seat of the first arm member.

13. The load bearing hinge joint of claim 1, wherein the second arm member is at a substantially right angle to the first arm member, such that the second end of the second arm member rests on the support seat of the first arm member when the load bearing hinge joint is in an open configuration.

14. An exercise pull-up device including two or more load bearing hinge joints, wherein each of the load bearing hinge joints comprise:

a first arm member, wherein the first arm member includes a top surface, a bottom surface, a first side surface, a second side surface, a first end and a second end; wherein the first side surface of the first arm member is opposite to, and at a first distance from, the second side surface of the first arm member;

a second arm member; wherein the second arm member includes a top surface, a bottom surface, a first side surface, a second side surface, a first end and a second end; wherein the first side surface of the second arm member is opposite to, and at a second distance from, the second side surface of the second arm member;

fastening means for pivotally interconnecting the second arm member to the first arm member, wherein a first fastening means positioned on the first side surface of the first arm member connects the first arm member to the second arm member at the first side surface of the second arm member; and wherein a second fastening means positioned on the second side surface of the first arm member connects the first arm member to the second arm member at the second side surface of the second arm member;

a support seat, wherein the support seat is positioned on the top surface of the first arm member proximate to the second end of the first arm member, wherein the second end is distal to and opposite facing the first end of the first arm member and wherein the support seat is configured to receive and support a bottom portion of the second arm member; and a shoulder, wherein the shoulder is positioned on the top surface of the first arm member, proximate to the support seat and wherein a second end of the shoulder most proximate to the second end of the first arm member is configured to act as a fulcrum to facilitate a pivotal rotation of the second arm member relative to the first arm member at a pivot point.

* * * * *